Feb. 12, 1952     C. S. CRANE     2,585,628
TIRE MOUNTING AND DEMOUNTING APPARATUS WITH CIRCUMFERENTIALLY
DISTRIBUTED THRUST MEMBERS
Filed Feb. 17, 1948
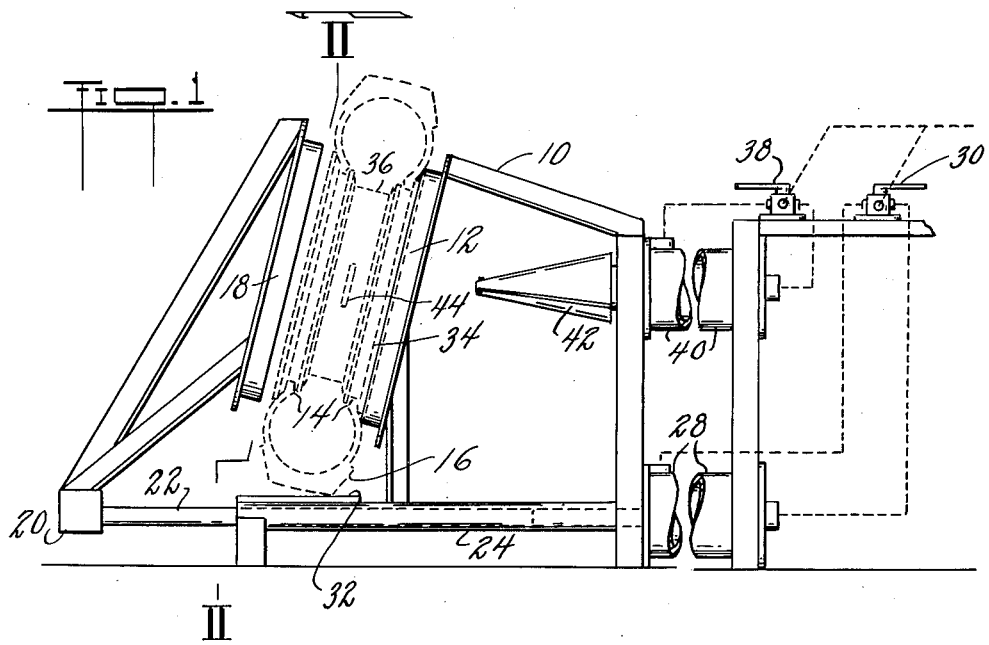
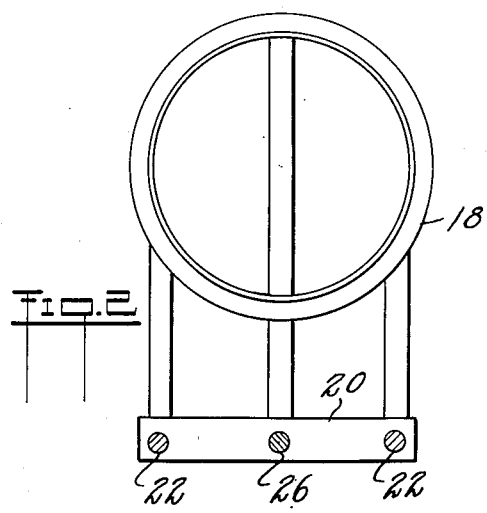
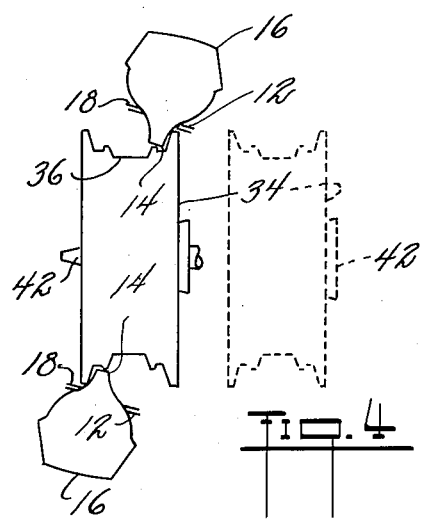
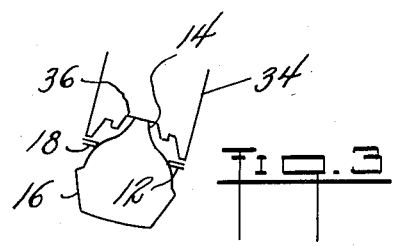
Charles S. Crane
INVENTOR.
BY Wm. O. Ballard
his attorney Patented Feb. 12, 1952

2,585,628

UNITED STATES PATENT OFFICE 2,585,628

TIRE MOUNTING AND DEMOUNTING APPARATUS WITH CIRCUMFERENTIALLY DISTRIBUTED THRUST MEMBERS

Charles S. Crane, Findlay, Ohio

Application February 17, 1948, Serial No. 8,931

5 Claims. (Cl. 157—1.2)

This invention relates to tire handling.

An object of this invention is to provide a method of removing and/or mounting automotive tires from or onto rims particularly handling tires and rims of the recently adopted passenger car "safety" type.

An additional object of this invention is to provide a device which with simplicity of operation will quickly and easily remove a tire from a rim or reverse the operation to mount a tire onto a rim.

A further object of this invention is to provide mechanisms which employ the disclosed novel method.

And a further object of this invention is to provide mechanisms which in employing this novel method will mount or demount tires on or from rims, without the necessity of any alteration of the equipment.

Referring to the drawings:

Fig. 1 is a side elevation of a simple form of mechanism employing the novel method herein disclosed;

Fig. 2 is a view on the line II—II, Fig. 1;

Fig. 3 is a diagrammatic showing of the relative position of the rim and tire following the squeezing or breaking of the tire bead from the rim edges; and Fig. 4 is a diagrammatic showing of the relative position of the parts through the succeeding movements.

The method herein comprises demounting an automotive tire, particularly the passenger car type, wherein the tire is mounted on a "safety" rim. The rim is a one piece ring having tire bead engaging edges or flanges with a well or semi-well therebetween circumferentially extending about the central portion of the rim between the edges. The tire is engaged along the side walls adjacent the bead of the tire or along the "soft" region on its opposite sides. This is accomplished by clamping a pair of substantially ring-shaped members thereagainst and squeezing or drawing said clamp elements toward each other. This breaks the tire bead away from the rim edges leaving the rim free. The beads being drawn together or nearly so, allows the rim to drop and the beads enter the central well, leaving the rim loose while the tire is preferably held in a predetermined position. For ease of operation, this position is a tilted one as to vertical, in the neighborhood of 15°.

A suitable chuck is then moved, manually or by power, to engage the rim about the hub opening. Such a chuck is usually conical and its apex enters the central or hub opening through the rim. As the chuck continues to travel through the opening, the rim is canted as to the tire and brought into substantially vertical position. At this point, the chuck has gripped the rim and is locked thereto.

Now, the perimeter of the rim and the inner circumference of the tire are angularly disposed. The chuck is moved away from the tire along a horizontal line, or rather in a line angularly passing through the plane of a circle extending medially about the periphery of the tire. This relative disposition of tire and rim permits ready withdrawal of the rim away from the tire.

To mount a tire, the movements are reversed. The rim is locked on the chuck and pushed into the collapsed or squeezed tire and released. The tire is then released and inflation thereof fully mounts the tire on the rim.

For convenience as well as protection, the inner tube is inflated just sufficiently to be self-positioning. This prevents pinching of the tube or its collapsing in any manner to impede smooth operation.

As an example of a simple machine employing all the necessary parts for full power operation and without unnecessary embellishments, there is herein shown such a device as having primary frame 10, constructed to utilize a minimum of space and of economical design.

This frame 10 mounts a fixed inclined ring 12 having a diameter approximating the average measurements of practically all standard passenger vehicle tires now in use adjacent the beads 14 of such tires 16.

A second similar ring 18 is mounted on crosshead 20 and the second ring is disposed in spaced substantially parallel relationship to the first ring and shiftable toward and away therefrom.

The rings 12, 18, may be continuous or segmental.

The crosshead 20 is carried by slides 22 mounted in guides 24 of the frame and the crosshead is reciprocated by piston rod 26 actuated by cylinder 28, which cylinder operation is in turn controlled by valve 30. The power for such operation may conveniently be derived from the source usually employed for tire inflation.

In operating the device, a tire 16 is rolled onto platform 32 and canted against the ring 12. This cant is preferably about 15° from vertical but may be several degrees either way therefrom to accommodate most tires. This places the tire side walls against the ring 12 which in turn frames or surrounds the rim 34.

Valve 30 is then operated to cause ring 18 to move toward ring 12 and grip and squeeze the tire therebetween to break the beads 14 away from the rim's outer edges or flanges.

The rim being free, drops slightly (Fig. 3) and the now approximately positioned beads 14 enter the well 36 about the rim. Now the tire is firmly held while the rim is loose therein.

Valve 38 is next operated to control power flow to cylinder 40 for thrusting conical chuck 42 forward and its apex passes through hub aperture 44 and the first action is to bring the rim into substantially vertical position relative to the tire (Fig. 4). The thrust continues until a diameter along the cone fits the aperture and the chuck then grips the rim. Chucks of this type are available.

Once the chuck grips the rim, the valve may then be operated to cause the chuck to move toward the cylinder 40 pulling the rim free from the tire. The canted tire allows free withdrawal of the rim and any slight overlapping of rim and inner tire diameter is cared for by the inherent nature of the flexible bead and side wall construction. The squeezing of the side walls toward each other also enlarges the inner diameter of the tire.

Obviously tires may be mounted by reversing the process, that is mounting the rim on the chuck and thrusting it into position within the squeezed tire and then releasing the tire.

A pneumatic drive is shown but, of course, various power sources may be used, manual, hydraulic, mechanical or their equivalents.

In certain extreme situations wherein the tire bead is unduly frozen to the rim, the chuck may be repeatedly reciprocated and used as a tool to gradually break the bead free. The independently controlled valves lend flexibility under such conditions.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and it is desired to secure by United States Letters Patent is:

1. In apparatus for demounting a tire from a rim, means for circumferentially engaging a side wall of said tire, additional means for circumferentially engaging the opposite side wall of said tire, means forcing the side wall engaging means toward each other for breaking the bead of said tire from the rim and to hold said tire in a fixed position, a reciprocal element movable along a line angularly extending through the plane of a circle extending medially about the periphery of said tire, said element including a rim gripping device, and means operating said element along said line.

2. The structure set forth in claim 1 wherein the side wall engaging means and the rim gripping device are power driven devices, and means for independently operating said devices.

3. The structure set forth in claim 1 wherein the line angular extent through the plane approximates 15° from vertical.

4. In a device of the class described, a frame, a tire receiving platform, a first circular member fixed with said frame and canted from vertical as to said platform and adjacent thereto, a second circular member opposing said first circular member and spaced therefrom whereby a tire on said platform will be disposed between said members and have its side walls in position to be engaged thereby, means for shifting said second member toward the first member and squeeze the tire therebetween, a drive therefor, a chuck reciprocably mounted on said frame, means for moving said chuck horizontally over said platform centrally through the tire to engage the tire rim, and a control for the reciprocal movement of said chuck.

5. The structure set forth in claim 4 wherein the cant from vertical of said first and second members approximates 15°.

CHARLES S. CRANE.

REFERENCES CITED

The following references are of record in the file of this patent:

UNITED STATES PATENTS

| Number | Name | Date |
| --- | --- | --- |
| 1,394,400 | Berg | Oct. 18, 1921 |
| 1,724,813 | Weaver et al. | Aug. 13, 1929 |
| 1,776,804 | Blaeser | Sept. 30, 1930 |
| 1,791,681 | Morgan | Feb. 10, 1931 |
| 1,855,259 | Smith | Apr. 26, 1932 |
| 1,896,629 | Julian | Feb. 7, 1933 |
| 2,201,982 | Bazarek | May 28, 1940 |
| 2,290,155 | Bratcher | July 21, 1942 |
| 2,418,849 | Polt | Apr. 15, 1947 |
| 2,469,723 | Greene | May 10, 1949 |